United States Patent
Sarapuk et al.

(10) Patent No.: US 11,074,258 B2
(45) Date of Patent: Jul. 27, 2021

(54) TEMPORARY MATERIALIZED VIEWS

(71) Applicant: SAP SE, Walldorf (DE)

(72) Inventors: Andrzej Sarapuk, Paris (FR); Swapnil Kasaliwal, Pune (IN); Abhishek Gupta, Pune (IN); Purva Joshi, Pune (IN)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 16/412,915

(22) Filed: May 15, 2019

(65) Prior Publication Data

US 2020/0364222 A1 Nov. 19, 2020

(51) Int. Cl.
*G06F 16/2453* (2019.01)
*G06F 16/22* (2019.01)
*G06F 16/23* (2019.01)

(52) U.S. Cl.
CPC .... *G06F 16/24539* (2019.01); *G06F 16/2282* (2019.01); *G06F 16/2393* (2019.01)

(58) Field of Classification Search
CPC ............. G06F 16/2282; G06F 16/2393; G06F 16/2445; G06F 16/24539; G06F 16/24552
See application file for complete search history.

(56) References Cited

U.S. PATENT DOCUMENTS

| | | | | |
|---|---|---|---|---|
| 5,276,870 | A * | 1/1994 | Shan | G06F 16/24561 |
| 6,684,203 | B1 * | 1/2004 | Waddington | G06F 16/24537 |
| | | | | 707/714 |
| 2006/0085465 | A1 * | 4/2006 | Nori | G06F 16/213 |
| 2012/0296890 | A1 * | 11/2012 | Sundaresan | G06F 16/2379 |
| | | | | 707/718 |
| 2014/0280028 | A1 * | 9/2014 | Ding | G06F 16/2393 |
| | | | | 707/717 |
| 2016/0098462 | A1 * | 4/2016 | George | G06F 16/248 |
| | | | | 707/609 |
| 2017/0177640 | A1 * | 6/2017 | Gopi | G06F 16/252 |

OTHER PUBLICATIONS

Lorentz et al. Oracle Database SQL Language Reference, 11g Release 2 (11.2), Jan. 2016 [retrieved on Dec. 7, 2020], Oracle, retrieved from the Internet: < URL: https://docs.oracle.com/cd/E11882_01/server.112/e41084.pdf>, E41084-04 (Year: 2016).*
PostgreSQL SQL Materialized Views, Archived at archive.org on Apr. 14, 2018 [Retrieved on Dec. 7, 2020], PostgreSQL Tutorial, Retrieved from the Internets URL https://web.archive.org/web/20180414141719/https://www.postgresqltutorial.com/postgresql-materialized-views/> (Year: 2018).*

* cited by examiner

*Primary Examiner* — James E Richardson
(74) *Attorney, Agent, or Firm* — Buckley, Maschoff & Talwalkar LLC (57) ABSTRACT

A system includes reception of a first query including a first temporary materialized view, where the first temporary materialized view associated with a first view and a first temporary table. The first temporary table is refreshed if it is determined that the first temporary materialized view is stale, and the first query is executed using a result set cached in the first temporary table. The first temporary table caches the result set for the remainder of the current database session.

20 Claims, 6 Drawing Sheets

TEMPORARY MATERIALIZED VIEWS

BACKGROUND

According to modern database terminology, a view is a SELECT statement that is stored as a database object. A view specifies one or more underlying base tables whose data is physically stored in the database. A view can be queried as if it is a database table, as in SELECT*FROM <view_name>. To execute such a query, the query definition and base tables may be merged into the query. Alternatively, the view may be materialized into an internal table which exists only during query execution. In either case, the SELECT statement of the view must be executed at query execution.

A materialized view is a database object associated with a query definition and whose result is computed and persisted in a database table. Materialized views are often created on frequently-executed, expensive queries, such as those involving intensive aggregation and join operations. Materialized views are designed to improve performance in databases serving many queries having common sub-expressions resulting in repetitive operations on base tables, by pre-computing the common sub-expressions and re-writing received queries to use the corresponding materialized views where possible.

Dedicated processing is required to ensure that the persisted table of a materialized view remains synchronized with the underlying base tables. Moreover, materialized views inefficiently require persistence of the same data in two different locations (i.e., in the underlying base tables and in the persisted table of the materialized view). Systems are desired to efficiently provide some of the advantages of views and materialized views while avoiding some of the drawbacks.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to temporary materialized views within a database system. A temporary materialized view is associated with a candidate view and a temporary table. Usage of a temporary materialized view creates a session-specific materialized result set that is refreshed at read time. Such features may reduce resource consumption as compared to materialized views while improving, with respect to traditional view processing, the performance of queries consisting of one or more levels of nested views.

A temporary materialized view according to some embodiments uses a temporary table for result set storage. For example, a global temporary table is populated whenever a select query on a candidate view associated with a temporary materialized view is executed. The result set is stored in the global temporary table only while the current session is active. Subsequent query references to the candidate view during the session are replaced with references to the associated temporary materialized view in order to access the cached result set during query execution. Since the cached result set persists until the end of a session, the result set can be re-used to answer multiple queries within the same session.

The result set is private to each session, while the definition and schema of the global temporary table remain the same across different sessions. Two sessions referencing the candidate view associated with a temporary materialized view would therefore not need to contend for a lock on the result set, and each session is able to modify its own copy of the result set. All the data of a global temporary table, but not the global temporary table itself, is automatically deleted at the end of a session.

Figure 1:
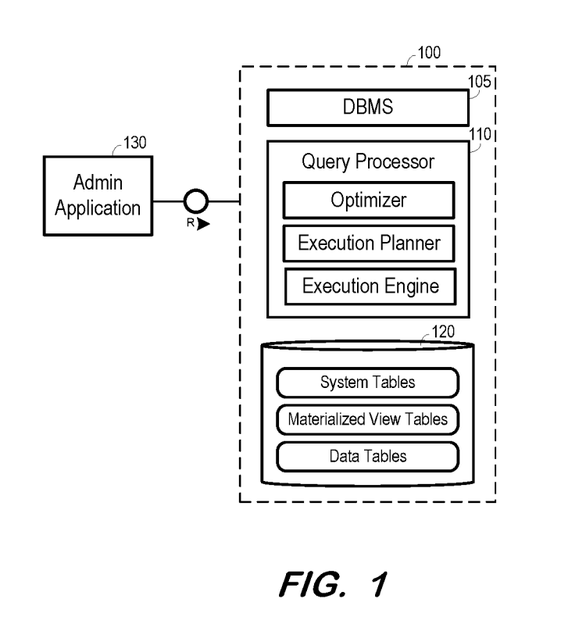
FIG. 1 is a block diagram of a database system providing temporary materialized tables according to some embodiments.

FIG. 1 is a block diagram of a database architecture according to some embodiments. Embodiments are not limited to the FIG. 1 architecture.

Database system 100 includes database management system 105, query processor 110 and data store 120. Generally, database system 100 operates to receive queries and return results based on data stored within data store 120. A received query may include instructions to create, read, update or delete one or more records. Database system 100 may comprise any single-node or distributed database system that is or becomes known.

Generally, database management system 105 includes program code to perform administrative and management functions of database system 100. Such functions may include external communication, lifecycle management, snapshot and backup, indexing, optimization, garbage collection, and/or any other database functions that are or become known.

Query processor 110 processes received Structured Query Language (SQL) and Multi-Dimensional eXpression (MDX) statements. Query processor 110 comprises program code executable to pre-process a received query, generate a query execution plan, and execute the plan. As will be described below, query processor 110 may operate in some embodiments to replace a named view within a query with a temporary materialized view.

Data store 120 comprises data tables storing data and system tables storing metadata such as database catalog as is known in the art. Data store 120 of the present example also stores persisted tables of the above-described materialized views. Data store 120 may also comprise a distributed system using any combination of storage devices that are or become known.

In some embodiments, the data of data store 120 may comprise one or more of conventional tabular data, row-based data, column-based data, and object-based data. Moreover, the data may be indexed and/or selectively replicated in an index to allow fast searching and retrieval thereof. Database system 100 may support multi-tenancy to separately support multiple unrelated clients by providing multiple logical database systems which are programmatically isolated from one another.

Database system 100 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Administrative application 130 may be operated by a database administrator to configure and manage database system 100. Administrative application 130 may communicate with database management system 105 via a graphical user interface and/or console. Configuration of database system 100 may include configuration of user permissions, specification of backup parameters, definition of logical schemas, definition of views, definition of materialized views and, according to some embodiments, definition of temporary materialized views. These permissions, parameters and definitions may be stored within system tables of datastore 120 and used during operation of database system 100.

Figure 2:
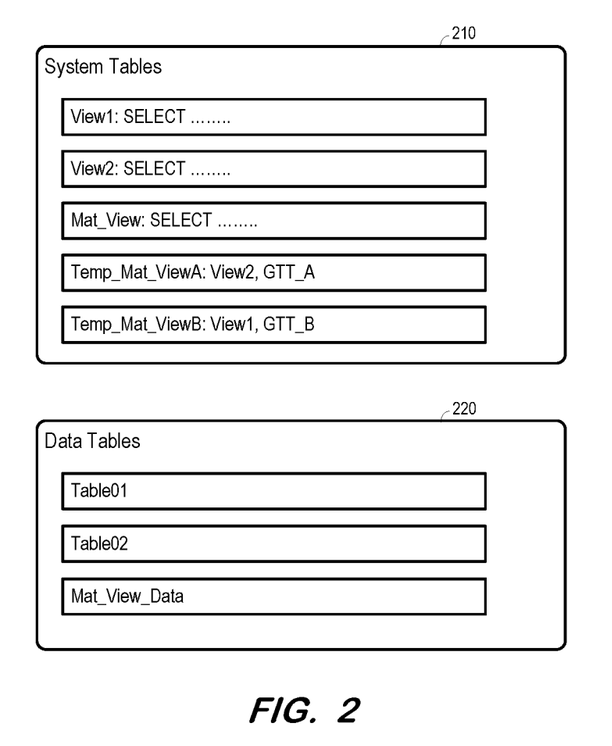
FIG. 2 illustrates system tables and data tables of a database system according to some embodiments.

FIG. 2 illustrates system tables 210 and data tables 220 of a database system according to some embodiments. System tables 210 store database objects of two different views, View1 and View2. Each database object includes a SELECT statement specifying underlying base tables of each view.

System tables 210 also store a database object associated with a materialized view Mat_View. This database object includes a SELECT statement specifying underlying base tables of the materialized view. As described above, materialized view Mat_View is associated with a persisted table Mat_View_Data of data tables 210.

System tables 210 of the present example also include objects associated with temporary materialized views Temp_ Mat_ViewA and Temp_Mat_ViewB. Temp_Mat_ViewA is associated with View2 and Temp_Mat_ViewB is associated with View1. Moreover, Temp_Mat_ViewA is associated with global temporary table GTT_A and Temp_Mat_ViewB is associated with global temporary table GTT_B.

According to some embodiments, a database administrator identifies views to associate with temporary materialized views. This identification may involve by observing system database design, system queries and system statistics. Statistics which may assist the identification include view usage count, number of set operators used in queries using a particular view, and execution time of a query using a particular view.

The database administrator may operate administrator application 130 to instruct database system 100 to create a temporary materialized view associated with an existing "candidate" view. For example, the instruction may comprise the command: "create materialized view <temp_mat_view_name> temporary refresh as select*from <view_name>". With respect to the FIG. 2 example, the database administrator entered the command "create materialized view Temp_Mat_ViewA temporary refresh as select*from View2".

As illustrated in FIG. 2, and in response to the command, database system 100 creates a mapping between the temporary materialized view (e.g., Temp_Mat_ViewA), the candidate view (e.g., View2), and a global temporary table object (e.g., GTT_A) in system tables 210. The definition tree of the temporary materialized view is used to refresh the temporary materialized view, and whereas the actual cached result set is stored in a session-level instance of global temporary table (GTT).

Figure 3:
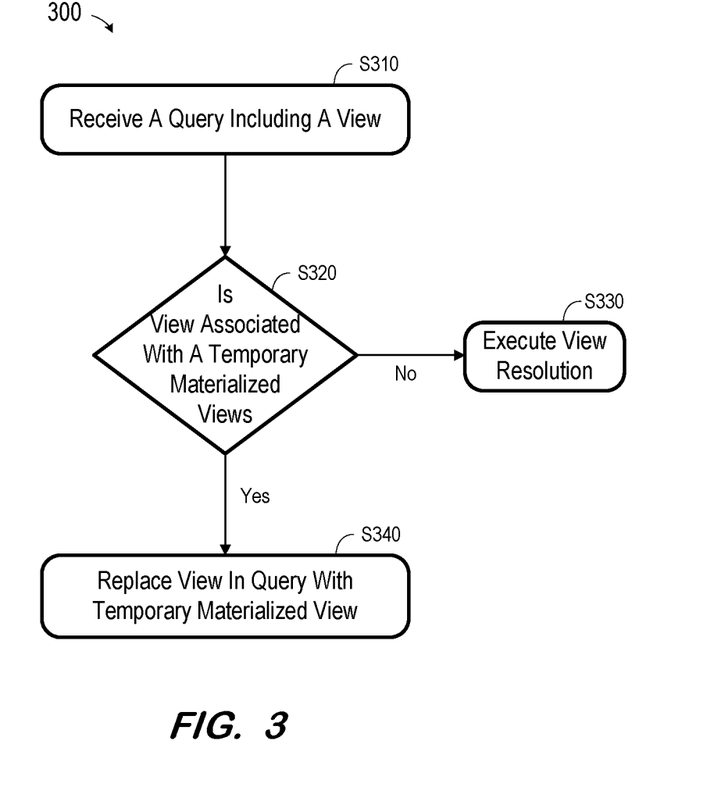
FIG. 3 is a flow diagram of view resolution during query optimization according to some embodiments.

FIG. 3 comprises a flow diagram of process 300 to resolve a view within a query during query optimization according to some embodiments. In some embodiments, various hardware elements of database system 100 execute program code to perform process 300. Process 300 may be executed by the query processor 110 of database system 100.

Process 300 and all other processes mentioned herein may be embodied in computer-executable program code read from one or more of non-transitory computer-readable media, such as a hard disk drive, a nonvolatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 4:
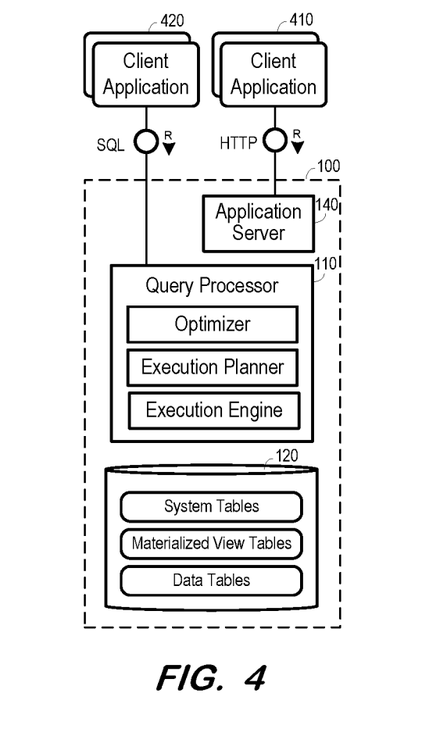
FIG. 4 is a block diagram of a database system providing temporary materialized tables during runtime according to some embodiments.

A query is received by database system 100 prior to S310. FIG. 4 illustrates a run-time landscape including database system 100 according to some embodiments. Application server 140 provides services for executing server applications. For example, Web applications executing on application server 140 may receive HyperText Transfer Protocol (HTTP) requests from client applications 410 as shown in FIG. 4. Application server 140 may generate SQL queries based on these requests and submit such queries to query processor 110. As also shown, client applications 420 may directly submit queries to query processor 110.

The query is received at S310 during a query optimization process performed by an optimizer in some embodiments. It will be assumed that the query includes a view as one of its one or more data sources. If not, process 300 is bypassed.

At S320, it is determined whether the view is associated with a temporary materialized table. The determination at S320 may comprise checking the system tables (e.g., system tables 210) to determine whether the view is associated with (i.e., mapped to) any of the temporary materialized views defined therein. If not, flow proceeds to S330 to execute standard view resolution processing. For example, the view may be replaced (i.e., merged) in the query by the query definition of the view specifying a SELECT statement and base tables, or the result set of the view may be materialized into internal query-specific worktables.

Flow proceeds to S340 if it is determined at S320 that the view is associated with a temporary materialized view. At S340, the view is replaced in the query with its associated temporary materialized view. Further optimization may then be performed on the thus-amended query prior to generating an execution plan.

Figure 5:
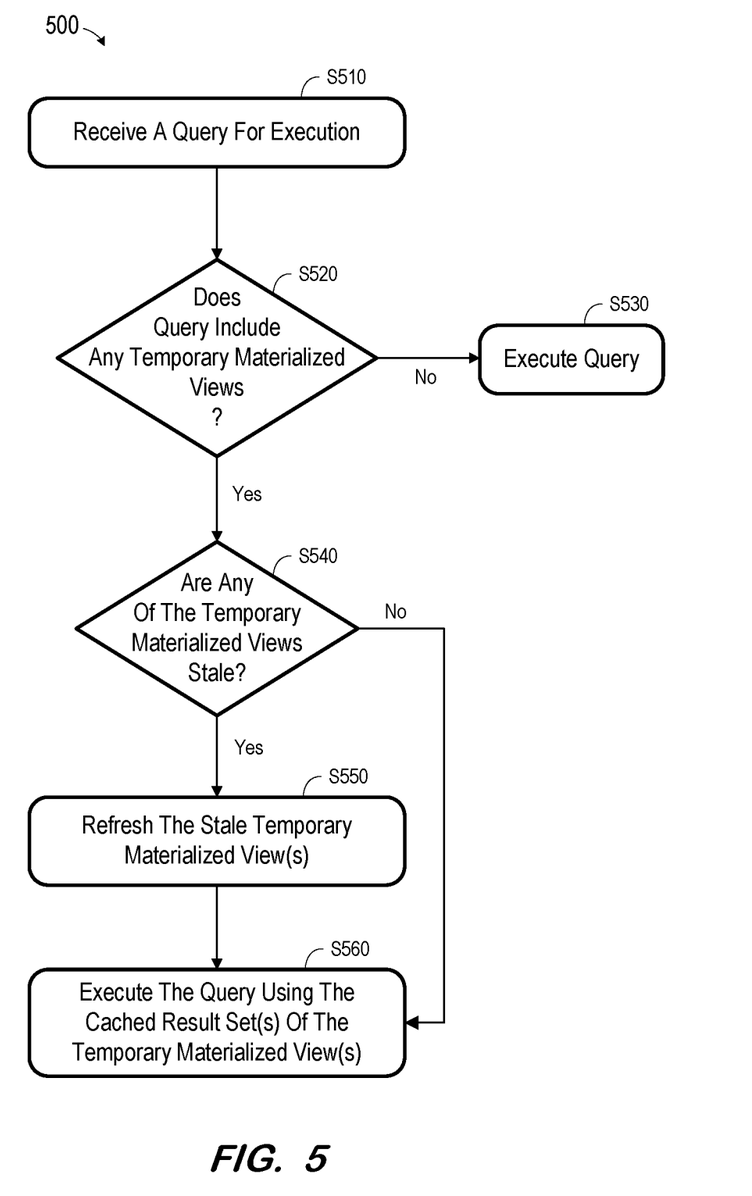
FIG. 5 is a flow diagram of query execution according to some embodiments.

FIG. 5 is a flow diagram of a process to execute a query including a temporary materialized view according to some embodiments. Process 500 may be performed by an execution engine of a query processor but embodiments are not limited thereto.

A query is received for execution at S510 and, at S520, it is determined whether the query includes any temporary materialized views. The determination may be performed by checking the data sources of the query against the temporary materialized views defined in the system tables. If the query does not include any temporary materialized views, flow proceeds to S530 for typical query execution as is known in the art.

On the other hand, flow proceeds from S520 to S530 if the query includes one or more temporary materialized views. At S530, it is determined whether any of the temporary materialized views of the query are "stale".

According to some embodiments, the base tables of a candidate view associated with a temporary materialized view and the session-level global temporary table associated with the temporary materialized view are each associated with an object level timestamp. The object level timestamp of the base tables is updated in response to any Insert, Update or Delete operations on any of the base table.

In order to determine whether any of the temporary materialized views of the query are stale at S530, it is determined whether the timestamp of the global temporary table is older that the timestamp of any of its underlying base tables. Alternatively, a temporary materialized view is considered stale if its session-level global temporary table does not yet exist (i.e., the current query is the first query of the session to use the candidate view).

If it is determined that none of the temporary materialized views of the query are stale, the query is executed at S560 using the cached result set of each temporary materialized view of the query. The cached result sets are stored in the session-level global temporary table associated with each temporary materialized view.

If one or more of the temporary materialized views of the query are determined to be stale at S540, flow proceeds to S550 to refresh the stale one or more temporary materialized views. According to some embodiments, S550 includes truncating the existing materialized result sets of the stale temporary materialized views. This may be performed by truncating the session's copy of the corresponding global temporary tables.

Next, the result sets are repopulated into global temporary tables based on the definitions of the associated candidate views. Repopulation may include execution of a query such as: "INSERT into <global temporary table> select*from <candidate_view>". Flow then continues to S560 to execute the query using the cached result set of each temporary materialized view of the query.

Figure 6:
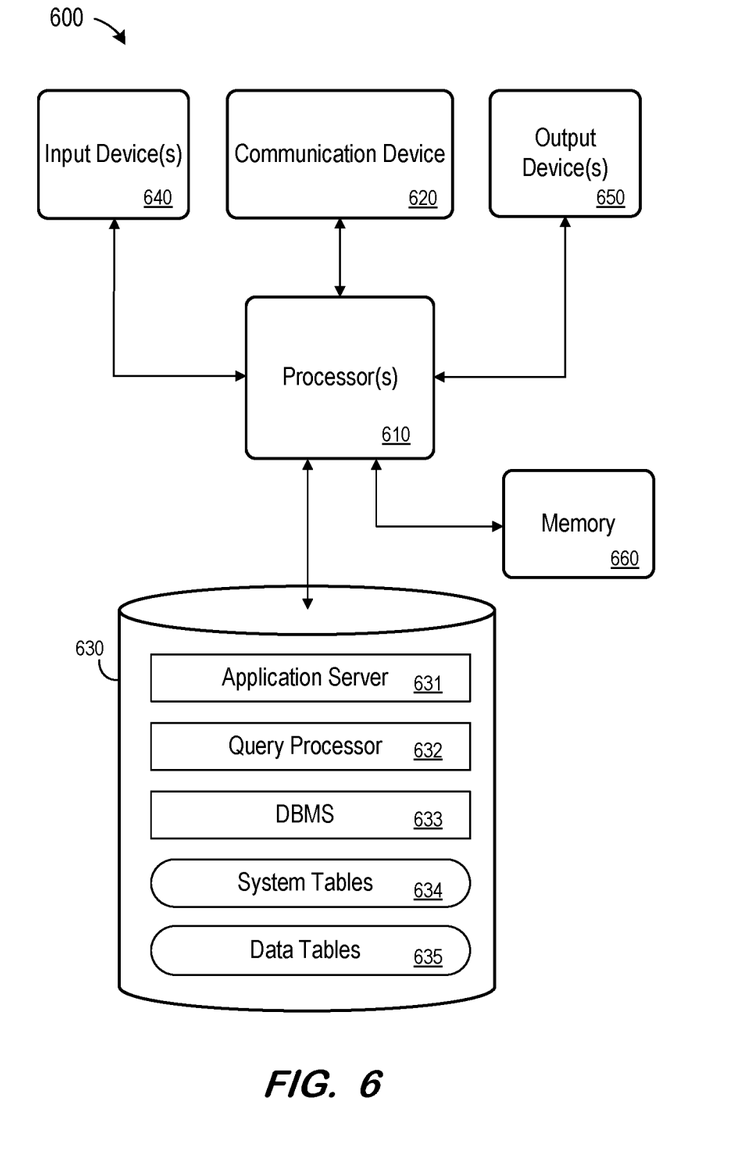
FIG. 6 is a block diagram of a database system according to some embodiments.

FIG. 6 is a block diagram of database system 600 according to some embodiments. Database system 600 may comprise a general-purpose computing apparatus and may execute program code to perform any of the functions described herein. Database system 600 may comprise an implementation of database system 100 in some embodiments. Database system 600 may include other unshown elements according to some embodiments.

Database system 600 includes processor(s) 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Application server 631, query processor 632 and database management system may each comprise program code executed by processor(s) 610 to cause server 600 to perform any one or more of the processes described herein. Embodiments are not limited to execution of these processes by a single computing device.

System tables 634 may store database configuration information, table schemas and definitions, and definitions of views and temporary materialized views as is known in the art. Data tables 635 may include database tables including view base tables and persisted materialized views. As also described above, database data (either cached or a full database) may be stored in volatile memory such as volatile memory 660. Data storage device 630 may also store data and other program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A database system comprising:
   a plurality of system tables storing system metadata, the system metadata associating a first temporary materialized view with a first view and a first temporary table, the first temporary table being used for storage of a result set of an execution of a query on the first view associated with the first temporary materialized view only during a first database session; and
   a query processor including an execution engine to execute program instructions to cause the system to:
      receive, during the first database session, a first query including the first temporary materialized view;
      determine, during the first session, whether the first temporary materialized view is stale;
      in an instance it is determined that the first temporary materialized view is stale, refresh the first temporary table; and
      execute the first query using a result set cached in the first temporary table during the first database session.

2. A system according to claim 1, wherein the determination of whether the first temporary materialized view is stale comprises:
   determining whether any of one or more base tables of the first view was modified after a last population of the first temporary table.

3. A system according to claim 2, wherein the determination of whether the first temporary materialized view is stale comprises:
   a comparison of a timestamp associated with the first temporary table against a timestamp associated with a base table of the first view.

4. A system according to claim 1, wherein the determination of whether the first temporary materialized view is stale comprises determining that the first temporary table has not been populated in the first database session.

5. A system according to claim 4, wherein the execution engine of the query processor further executes program instructions to cause the system to:
   detect a termination of the first database session; and
   in response to the detected termination of the first database session, delete any data stored in the first temporary table.

6. A system according to claim 1, wherein the execution engine of the query processor further executes program instructions to cause the system to:
   receive a second query during the first database session, the second query including the first temporary materialized view; and
   execute the second query using the result set cached in the first temporary table.

7. A system according to claim 6, wherein the query processor further executes program instructions to cause the system to:
   detect a termination of the first database session; and
   in response to the detected termination of the first database session, delete the result set cached in the first temporary table.

8. A computer-implemented method, comprising:
   storing system metadata associating a first temporary materialized view with a first view and a first temporary table, the first temporary table being used for storage of a result set of an execution of a query on the first view associated with the first temporary materialized view only during a first database session;
   receiving, during the first database session, a first query including the first view;
   replacing, during the first database session, the first view in the first query with the first temporary materialized view;
   determining, during the first database session, whether the first temporary materialized view cached in the first temporary table is stale;
   in an instance it is determined that the the first temporary materialized view is stale, refreshing the result set cached in the first temporary table; and
   executing the first query using the result set cached in the first temporary table during the first database session.

9. A method according to claim 8, wherein the determining of whether the first temporary table is stale comprises:
   determining whether any of one or more base tables of the first view was modified after a last population of the first temporary table.

10. A method according to claim 9, wherein the determining of whether the first temporary table is stale comprises:
    comparing a timestamp associated with the first temporary table against a timestamp associated with a base table of the first view.

11. A method according to claim 8, wherein the determining of whether the first temporary table is stale comprises determining that the first temporary table has not been populated in the first database session.

12. A method according to claim 11, further comprising detecting termination of the first database session and, in response to the detected termination of the first database session, deleting any data stored in the first temporary table.

13. A method according to claim 8, further comprising:
    receiving a second query during the first database session, the second query including the first view;
    replacing the first view in the second query with the first temporary materialized view; and
    executing the second query using the result set cached in the first temporary table.

14. A method according to claim 13, further comprising:
    detecting a termination of the first database session; and
    in response to the detected termination of the first database session, deleting the result set cached in the first temporary table.

15. A non-transitory computer-readable medium storing program code executable by a computing system to cause the computing system to:
    receive, during a first database session, a first query including a first temporary materialized view, the first temporary materialized view associated with a first view and a first temporary table, the first temporary table being used for storage of a result set of an execution of a query on the first view associated with the first temporary materialized view only during the first database session;
    determine, during the first database session, whether the first temporary materialized view is stale;
    in an instance it is determined that the first temporary materialized view is stale, refresh the first temporary table; and
    execute the first query using a result set cached in the first temporary table during the first database session.

16. A non-transitory medium according to claim 15, wherein the determination of whether the first temporary materialized view is stale comprises:
    a comparison of a timestamp associated with the first temporary table against a timestamp associated with a base table of the first view.

17. A non-transitory medium according to claim 15, wherein the determination of whether the first temporary materialized view is stale comprises determining that the first temporary table has not been populated in the first database session.

18. A non-transitory medium according to claim 17, the program code executable by the computing system to cause the computing system to detect a termination of the current database session and, in response to the detected termination of the current database session, delete any data stored in the first temporary table.

19. A non-transitory medium according to claim 15, wherein the program code executable by the computing system further causes the computing system to:
    receive a second query during the first database session, the second query including the first temporary materialized view; and
    execute the second query using the result set cached in the first temporary table.

20. A non-transitory medium according to claim 19, wherein the program code executable by the computing system further causes the computing system to detect termination of the first database session and, in response to the detected termination of the first database session, delete the result set cached in the first temporary table.

* * * * *